(12) United States Patent
Sen et al.

(10) Patent No.: US 12,430,810 B2
(45) Date of Patent: Sep. 30, 2025

(54) METHOD AND APPARATUS FOR REMOVING SHADOWS FROM HIGH RESOLUTION IMAGES

(71) Applicant: SAMSUNG ELECTRONICS CO., LTD., Suwon-si (KR)

(72) Inventors: Mrinmoy Sen, West Bengal (IN); Sai Pradyumna Chermala, Telangana (IN); Venkat Ramana Peddigari, Telangana (IN); Nazrinbanu Nurmohammad Nagori, Bangalore (IN); Mansi Singh, Lucknow (IN); Bindigan Hariprasanna Pawan Prasad, Bangalore (IN); Moonhwan Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 133 days.

(21) Appl. No.: 17/720,962

(22) Filed: Apr. 14, 2022

(65) Prior Publication Data
US 2022/0301235 A1    Sep. 22, 2022

Related U.S. Application Data

(63) Continuation of application No. PCT/KR2022/003625, filed on Mar. 15, 2022.

(30) Foreign Application Priority Data

Mar. 16, 2021 (IN) .............................. 202141011213
Feb. 16, 2022 (IN) .............................. 202141011213

(51) Int. Cl.
*G06T 11/00* (2006.01)
*G06T 3/40* (2024.01)
*G06V 10/74* (2022.01)

(52) U.S. Cl.
CPC ................ *G06T 11/00* (2013.01); *G06T 3/40* (2013.01); *G06V 10/74* (2022.01)

(58) Field of Classification Search
CPC ............ G06T 11/00; G06T 3/40; G06V 10/74
(Continued)

(56) References Cited

U.S. PATENT DOCUMENTS

2010/0014776 A1    1/2010  Marchesotti
2011/0273620 A1   11/2011  Berkovich et al.
(Continued)

FOREIGN PATENT DOCUMENTS

CN    110443763    11/2019
CN    112102201    12/2020
(Continued)

OTHER PUBLICATIONS

Cun, "Towards Ghost-Free Shadow Removal via Dual Hierarchical Aggregation Network and Shadow Matting GAN" (year 2020), The Thirty-Fourth AAAI Conference on Artificial Intelligence (AAAI-20), pertinent pp. 10680-10687, Year 2020.*
(Continued)

*Primary Examiner* — Hai Tao Sun
(74) *Attorney, Agent, or Firm* — Nixon & Vanderhye, P.C.

(57) ABSTRACT

The present disclosure relates to method and apparatus for removing shadows from a High Resolution (HR) image. The HR image including shadows is received. The HR image converted into Low Resolution (LR) image. LR shadow-free image is generated from the LR image using first Artificial Intelligence (AI) model. A HR shadow-free image is generated based on combination of the LR shadow-free image and the HR image using second AI model. The present disclosure provides an efficient framework and lightweight network architectures which are used to remove the shadows (Continued)

based on corresponding shadow characteristics. The framework can be deployed in resource-constrained platforms. The present disclosure facilitates processing selected areas of the HR image and retaining the unselected area. Thus, less computational resources are required.

15 Claims, 9 Drawing Sheets

(58) Field of Classification Search
USPC .................................................. 345/582
See application file for complete search history.

(56) References Cited

U.S. PATENT DOCUMENTS

| | | | |
|---|---|---|---|
| 2018/0232865 | A1 | 8/2018 | Chiba et al. |
| 2018/0301121 | A1* | 10/2018 | Kim ................ H04N 21/41265 |
| 2019/0073558 | A1 | 3/2019 | Otake |
| 2019/0095710 | A1 | 3/2019 | Rees et al. |
| 2019/0236757 | A1* | 8/2019 | Wang .................... G06T 3/4092 |
| 2019/0266706 | A1 | 8/2019 | Mondal et al. |
| 2022/0207790 | A1* | 6/2022 | Wu ......................... G06T 11/00 |

FOREIGN PATENT DOCUMENTS

| | | |
|---|---|---|
| JP | 2020-030750 | 2/2020 |
| KR | 10-1995523 | 6/2019 |

OTHER PUBLICATIONS

Lei Zhu et al., "Bidirectional Feature Pyramid Network with Recurrent Attention Residual Modules for Shadow Detection", 2018, 16 pp., available on Springer Link: https://link.springer.com/conference/eccv.

Xintao Wang et al., "ESRGAN: Enhanced Super-Resolution Generative Adversarial networks", Sep. 17, 2018, 23 pp., arXiv:1809.00219v2, [cs.CV], available at: https://arxiv.org/abs/1809.00219v2.

Márcio C. F. Macedo et al., "Real-time shadow detection using multi-channel binarization and noise removal", Original Research Paper, Journal of Real-Time Image Processing, published online: Jun. 18, 2018, 14 pp., available at: https://doi.org/10.1007/s11554-018-0799-3.

Hieu Le et al., "Shadow Removal via Shadow Image Decomposition", Aug. 23, 2019, 10 pp., arXiv:1908.08628v1, [cs.CV], available at: https//arxiv.org/abs/1908.08628.

Xiaodong Cun et al., "Towards Ghost-free Shadow Removal via Dual Hierarchical Aggregation Network and Shadow Matting GAN", Nov. 21, 2019, 9 pp., arXiv:1911.08718v2, [cs.CV], available at: https://arxiv.org/abs/1911.08718.

Andy Day, "Artificial Intelligence Is Getting Insanely Good at Removing Shadows From Photographs of Faces", Aug. 25, 2020, 10 pp., at URL: https://fstoppers.com/post-production/artificial-intelligence-getting-insanely-good-removing-shadows-photographs-faces-509108.

Search Report and Written Opinion issued Jun. 22, 2022 in counterpart International Patent Application No. PCT/KR2022/003625.

Márcio C. F. Macedo et al., "Real-time shadow detection suing multi-channel binarization and noise removal", Original Research Paper, Journal of Real-Time Image Processing, published online: Jun. 18, 2018, 14 pp., available at: https://doi.org/10.1007/s11554-018-0799-3.

* cited by examiner

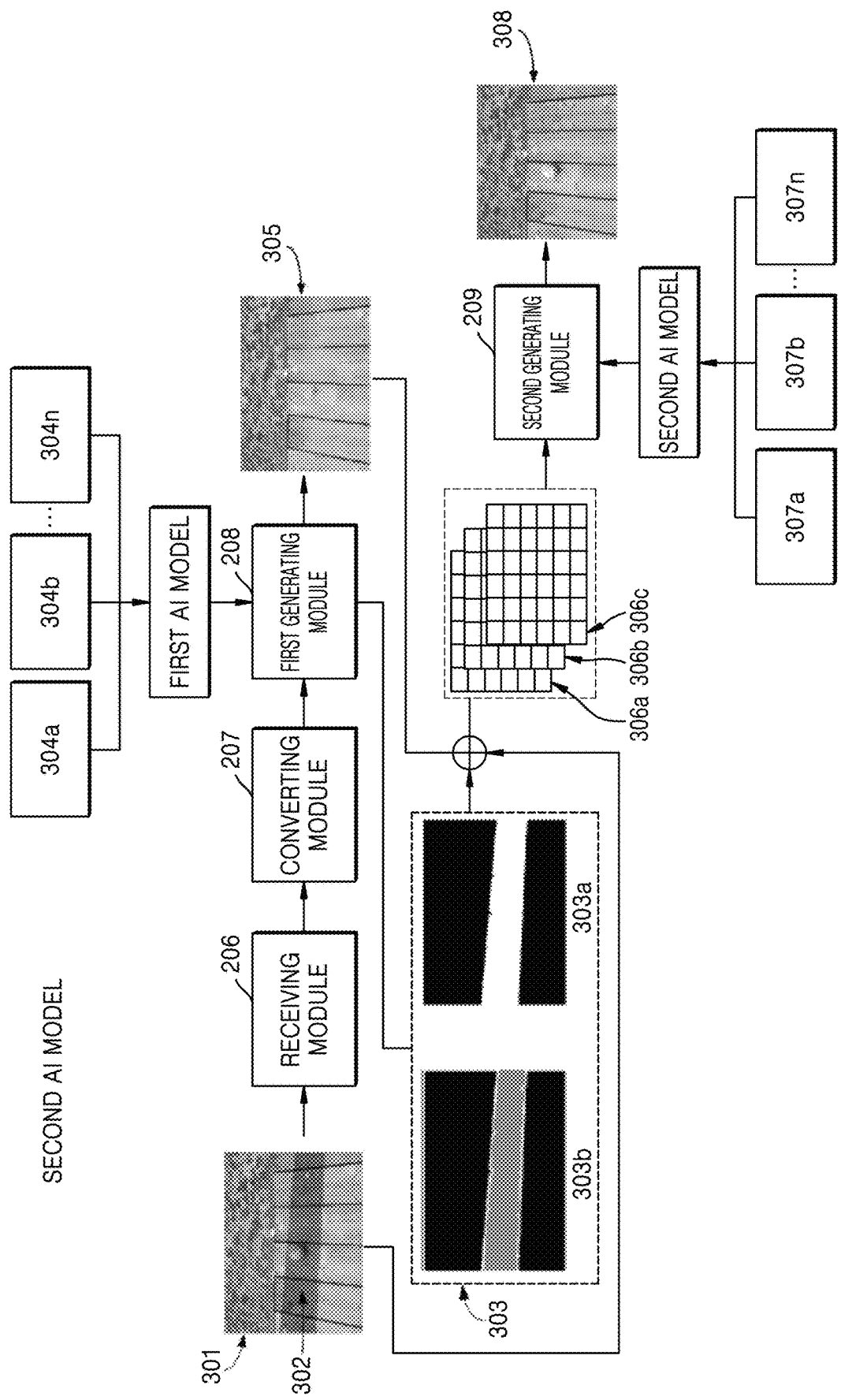

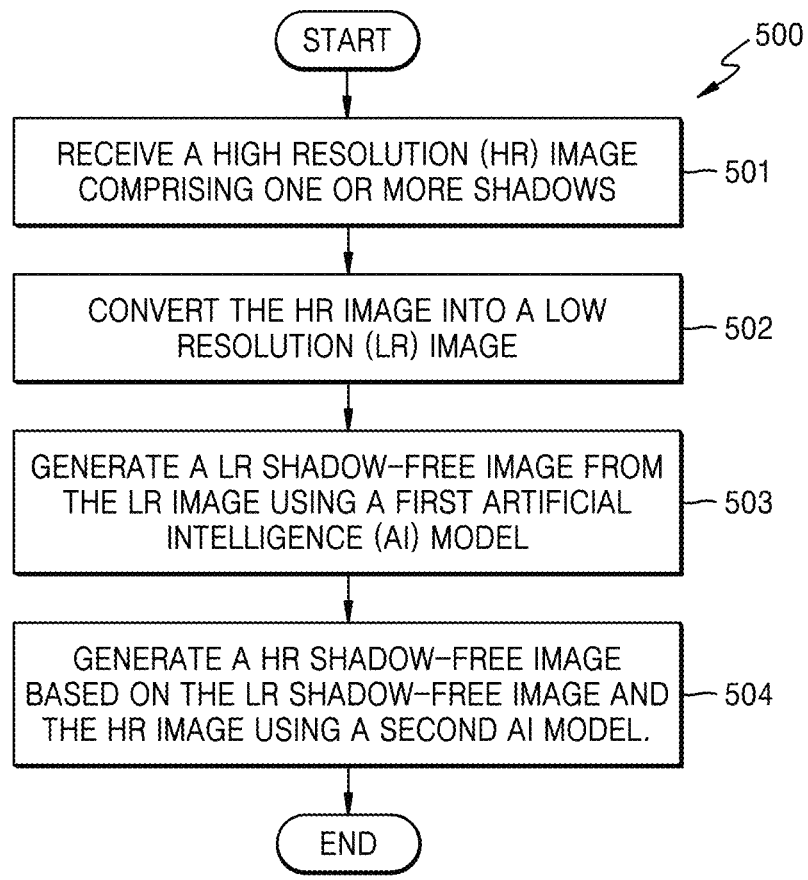

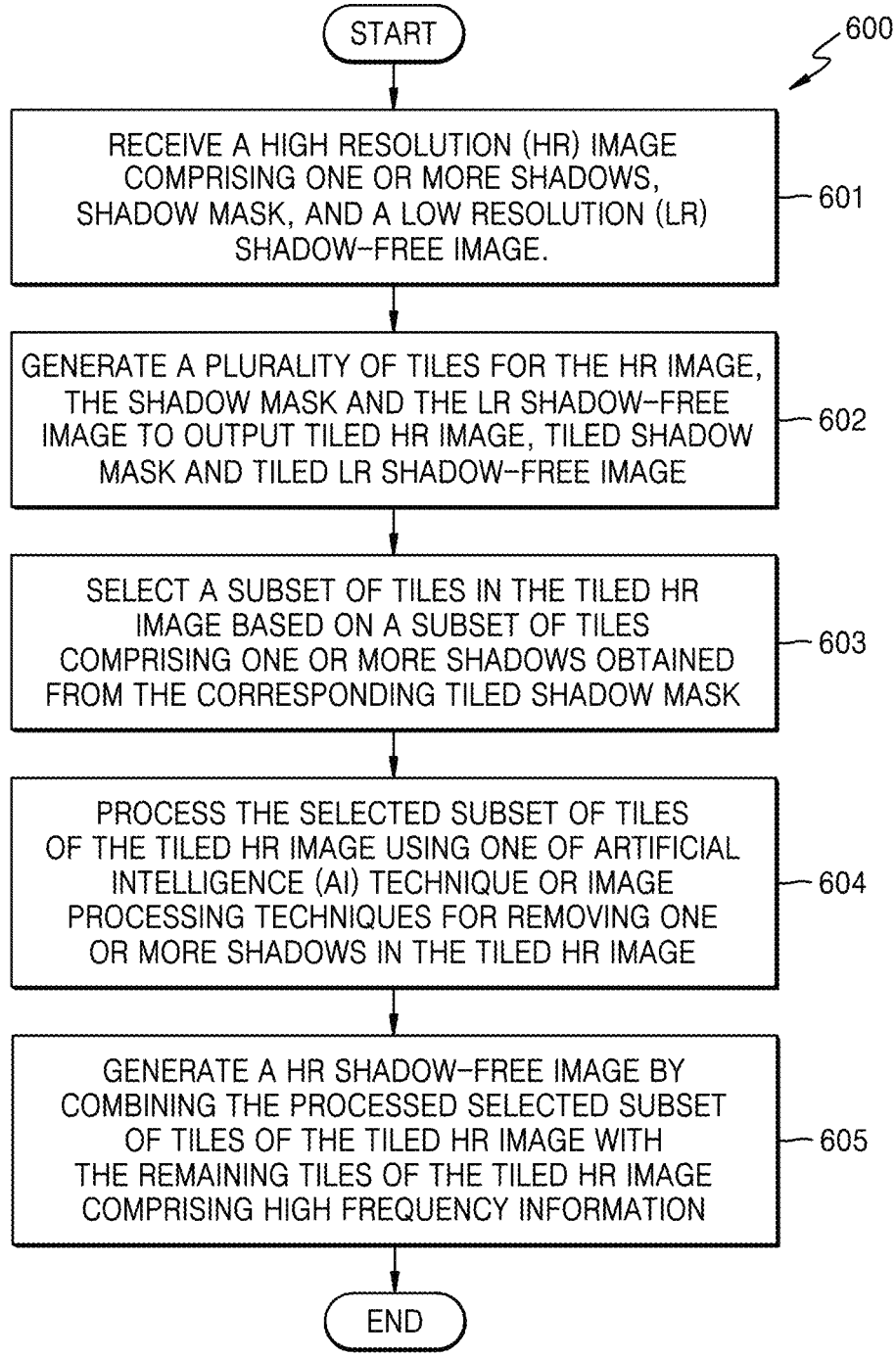

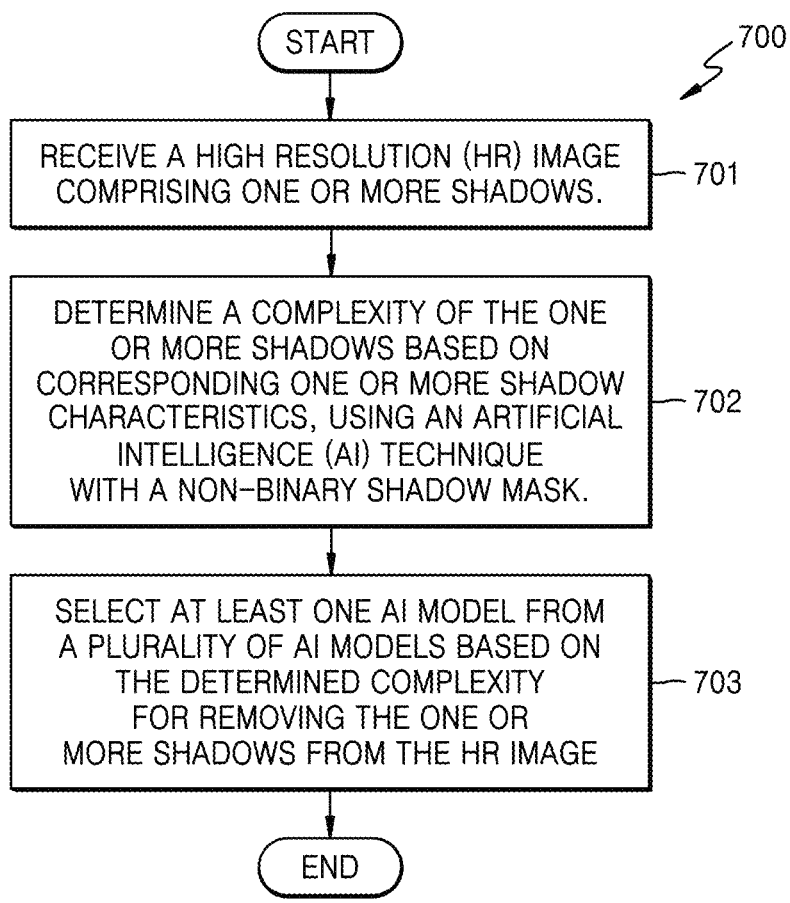

METHOD AND APPARATUS FOR REMOVING SHADOWS FROM HIGH RESOLUTION IMAGES

CROSS-REFERENCE TO RELATED APPLICATIONS

This application is a continuation of International Application No. PCT/KR2022/003625 designating the United States, filed on Mar. 15, 2022, in the Korean Intellectual Property Receiving Office and claiming priority to Indian Provisional Application No. 202141011213, filed on Mar. 16, 2021, in the Indian Patent Office, and to Indian Complete Patent Application No. 202141011213, filed on Feb. 16, 2022, in the Indian Patent Office, the disclosures of all of which are incorporated by reference herein in their entireties.

BACKGROUND

Field

The disclosure relates, in general, to image processing technology, and for example, to method and apparatus for removing shadows from a High Resolution (HR) image.

Description of Related Art

Generally, shadows are formed in an image when light is occluded by an opaque object or material. Shadows are undesired in images and can act as an obstruction to information in images. Removal of shadow plays an important role in the images as well in videos. Shadow often degrades visual quality of images. So, it is necessary to remove shadows from images to improve the visual quality. Existing systems use different techniques and algorithms to remove shadows from a High Resolution (HR) image. Existing shadow removal techniques lack in HR image quality while performing shadow removal tasks. Generally, the shadow removal techniques convert HR image including shadows into Low Resolution (LR) image to remove shadows. After removing shadows from the LR image, the LR image is converted back to HR image. But these techniques cannot efficiently convert LR image to HR image without image property loss. Other existing systems rely on manual intervention to fix and remove shadows. Further, the existing systems require high computational power to process the HR images. Moreover, these existing techniques rely on heavy network architectures making them infeasible to deploy on resource-constrained platforms such as smartphones.

In view of the above, there is a need to build a framework which removes one or more shadows from the HR images with less computational resources by selectively processing the HR image.

The information disclosed in this background of the disclosure section is simply provided for enhancement of understanding of the general background of the disclosure and should not be taken as an acknowledgment or any form of suggestion that this information forms the prior art already skilled in the art.

SUMMARY

Additional features and advantages may be realized through the present disclosure. Various example embodiments and aspects of the disclosure are described in greater detail herein and are considered a part of the disclosure.

Embodiments of the disclosure provide a method for removing one or more shadows in a High Resolution (HR) image. The method is performed by an apparatus.

According to various example embodiments, the method comprises: receiving a High Resolution (HR) image comprising one or more shadows; converting the HR image into a Low Resolution (LR) image; generating a LR shadow-free image from the LR image using a first Artificial Intelligence (AI) model; and generating an HR shadow-free image based on combination of the LR shadow-free image and the HR image using a second AI model.

According to various example embodiments, the converting of the HR image into the LR image comprises: downsampling the HR image to the LR image using one or more image down sampling techniques.

According to various example embodiments, the generating of the LR shadow-free image comprises: generating up-sampled LR shadow-free image provided to the second AI model by adjusting resolution size of the LR shadow-free image.

According to various example embodiments, the generating the HR shadow-free image comprises: identifying, by the apparatus, the one or more shadows using a shadow mask; and applying, by the apparatus, the second AI model to generate the HR shadow-free image, wherein the HR shadow-free image comprises high frequency information obtained from the HR image, and low frequency information obtained from the LR shadow-free image in a region of the one or more shadows.

According to various example embodiments, the low frequency information may comprises at least one of color and texture in the image, and the high frequency information may further comprise the edge information in the image.

According to various example embodiments; an apparatus for removing one or more shadows in a High Resolution (HR) image comprises: a processor and a memory. The processor is configured to: receive a High Resolution (HR) image comprising one or more shadows; convert the HR image into a Low Resolution (LR) image; generate a LR shadow-free image from the LR image using a first Artificial Intelligence (AI) model; and generate an HR shadow-free image based on combination of the LR shadow-free image and the HR image using a second AI model.

According to various example embodiments, a method for selectively processing a High Resolution (HR) image to remove one or more shadows comprises: receiving a High Resolution (HR) image comprising one or more shadows, a shadow mask, and a Low Resolution (LR) shadow-free image; generating a plurality of tiles for the HR image, the shadow mask and the LR shadow-free image to output tiled HR image, tiled shadow mask and tiled LR shadow-free image; selecting a subset of tiles in the tiled HR image based on a subset of tiles comprising one or more shadows obtained from the corresponding tiled shadow mask; processing the selected subset of tiles of the tiled HR image using one of an Artificial Intelligence (AI) technique or image processing techniques for removing one or more shadows in the tiled HR image; and generating a HR shadow-free image by combining the processed selected subset of tiles of the tiled HR image with the remaining tiles of the tiled HR image.

According to various example embodiments, an apparatus for selectively processing a High Resolution (HR) image for removing one or more shadows comprises: a processor and a memory. The processor is configured to: receive a High Resolution (HR) image comprising one or more shadows, a shadow mask, and a Low Resolution (LR) shadow-free;

generate a plurality of tiles for the HR image, the shadow mask and the LR shadow-free image to output tiled HR image, tiled shadow mask and tiled LR shadow-free image; select a subset of tiles in the tiled HR image based on a subset of tiles comprising one or more shadows obtained from the corresponding tiled shadow mask; process the selected subset of tiles of the tiled HR image, using one of an Artificial Intelligence (AI) technique or image processing techniques for removing one or more shadows in the tiled HR image; and generate a HR shadow-free image by combining the processed selected subset of tiles of the tiled HR image with the remaining tiles of the tiled HR image.

According to various example embodiments, the above apparatus, wherein the processor is configured to process the selected subset of tiles of the tiled HR image, wherein the processor is further configured to: compare the selected subset of tiles of the tiled HR image with a corresponding subset of tiles of the tiled LR shadow-free image; and process the selected subset of tiles of the tiled HR image by retrieving low frequency information from the corresponding subset of tiles of the tiled LR shadow-free image.

According to various example embodiments, a method of removing one or more shadows in a High Resolution (HR) image comprises: receiving a High Resolution (HR) image comprising one or more shadows; determining a complexity of the one or more shadows based on corresponding one or more shadow characteristics using an Artificial Intelligence (AI) technique with a non-binary shadow mask; and selecting at least one AI model from a plurality of AI models based on the determined complexity for removing the one or more shadows from the HR image.

According to various example embodiments, an apparatus for removing one or more shadows in a High Resolution (HR) image comprises: a processor and a memory. The processor is configured to: receive a High Resolution (HR) image comprising one or more shadows; determine complexity of the one or more shadows based on corresponding one or more shadow characteristics using an Artificial Intelligence (AI) technique with a non-binary shadow mask; and select at least one AI model from a plurality of AI models based on the determined complexity for removing the one or more shadows from the HR image.

According to various example embodiments, the above apparatus, wherein the one or more shadow characteristics comprises at least one of a shadow shape, a shadow intensity, a shadow color, background of shadow, and overlapping of shadows.

According to various example embodiments, a non-transitory computer-readable storage medium, having a computer program stored thereon that performs, when executed by a processor, the method according to the above method.

The various example embodiments presented above are not intended to be in any way limiting. In addition to the illustrative aspects, embodiments, and features described above, further aspects, embodiments, and features may become apparent by reference to the drawings and the following detailed description.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3A is a diagram illustrating an example apparatus for generating a HR shadow-free image, according to various embodiments;

FIG. 4 is a flowchart illustrating an example method for removing one or more shadows from a HR image, according to various embodiments;

FIG. 5 is a flowchart illustrating an example method for selectively processing a HR image for removing one or more shadows, according to various embodiments;

FIG. 6 is a flowchart illustrating an example method for removing one or more shadows in a HR image based on complexity of one or more shadows, according to various embodiments;

DETAILED DESCRIPTION

Figure 1:
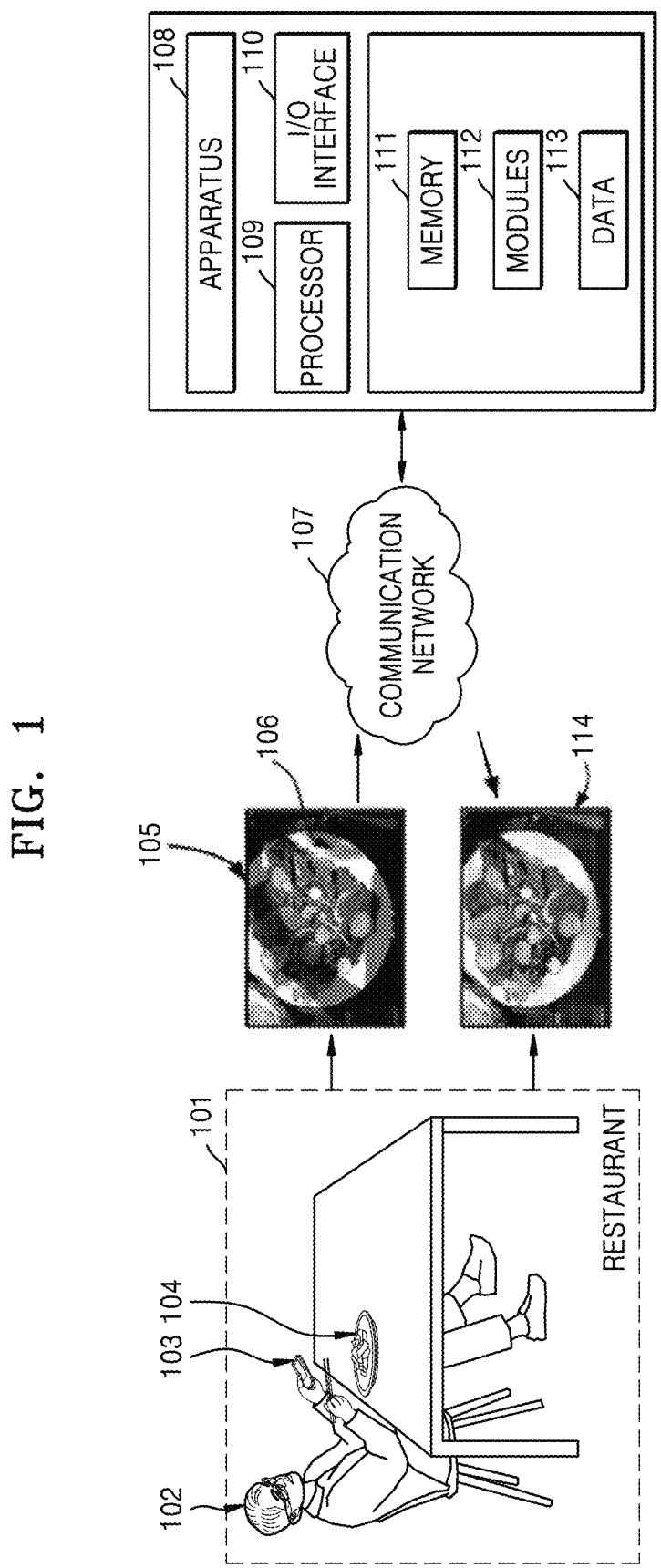
FIG. 1 is a diagram illustrating an example environment for removing one or more shadows in a High Resolution (HR) image, according to various embodiments.

It should be appreciated by those skilled in the art that any block diagrams herein represent conceptual views of illustrative systems embodying the principles of the present disclosure. Similarly, it may be appreciated that any flowcharts, flow diagrams, state transition diagrams, pseudo code, and the like represent various processes which may be substantially represented in computer readable medium and executed by a computer or processor, whether or not such computer or processor is explicitly shown.

In the present disclosure, the word "exemplary" is used herein to refer, for example, to "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof are shown by way of non-limiting example in the drawings and may be described in greater detail below. It should be understood, however that it is not intended to limit the disclosure to the particular forms disclosed, but instead, the disclosure is to cover all modifications, equivalents, and alternative falling within the scope of the disclosure.

The terms "comprise", "includes", "comprising", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

In the following detailed description, reference is made to the accompanying drawings that form a part hereof, and in which are shown by way of illustration of various example embodiments in which the disclosure may be practiced. These example embodiments are described in sufficient detail to enable those skilled in the art to practice the disclosure, and it is to be understood that various embodiments may be utilized and that changes may be made without departing from the scope of the present disclosure. The following description is, therefore, not to be taken in a limiting sense.

The present disclosure relates to removing shadows from a High Resolution (HR) image. The HR image including shadows is received. The HR image is converted into Low Resolution (LR) image, where the shadows are removed using a first Artificial Intelligence (AI) model. Further, the LR shadow-free image is up-scaled to HR shadow-free image using a second AI model. The present disclosure provides an efficient framework to remove one or more shadows from the HR image by retaining quality of the HR image. The lightweight network architectures are used to remove the one or more shadows based on complexity of one or more shadows. Thereby the framework can be deployed in resource-constrained platforms. The present disclosure facilitates to process only selected area of the HR image and retaining unselected area. Thus, less computational resources are required.

FIG. 1 is a diagram illustrating an example environment (100) for removing one or more shadows (106) in a High Resolution (HR) image (105), according to various embodiments. The example environment (100) may include, but is not limited to, an indoor environment, an outdoor environment, and so on. The indoor environment may include, for example, and without limitation, a restaurant, home, shopping mall, office, educational institution, and the like. The outdoor environment may include, for example, and without limitation, a playground, agriculture field, garden, and the like. The example environment (100) illustrated in FIG. 1 comprises the restaurant (101) or any other equivalent, a communication network (107), and an apparatus (108). The environment of FIG. 1 is merely an example and should not be considered as a limitation. The restaurant (101) may include, but is not limited to, at least one user (102), at least one user device (103), and plurality of Food and Beverage (F&B) services (not shown in FIG. 1). The at least one user device (103) may include, for example, and without limitation, a smart phone, a mobile device, a tablet, a computer, and the like. The at least one user device (103) may be configured to capture High resolution (HR) image (105) (e.g., 12 Megapixel (MP) or higher or at least 300 ppi (pixels per inch)) of at least one food item (104) or a document or any general scene by accessing a camera application (not shown in FIG. 1) installed in the at least one user device (103). The HR image (105) may include one or more shadows (106). The apparatus (108) may be configured to receive the HR image (105) including one or more shadows (106) in the HR image (105) from the at least one user device (103) via the communication network (107). The apparatus (108) may be implemented in a variety of computing systems, such as, for example, and without limitation, a smartphone, a laptop, a mobile device, a tablet, a computer, a desktop computer, a Personal Computer (PC), a notebook, a tablet, e-book readers, a server, a network server, a cloud-based server, and the like. The apparatus (108) may include at least one Central Processing Unit (also referred to as "CPU" or "processor") (109) and a memory (111) storing instructions executable by the processor (109). The processor (109) may comprise at least one data processor for executing program components to execute user requests or system-generated requests. The memory (111) is communicatively coupled to the processor (109). The memory (111) stores instructions, executable by the processor (109), which, on execution, may cause the apparatus (108) to generate a HR shadow-free image (114) by removing the one or more shadows (106) from the HR image (105) for the at least one user (102). In an embodiment, the apparatus (108) may be an application in the at least one user device (103).

In an embodiment, the memory (111) may include modules (112) and data (113). The modules (112) may be configured to perform the steps of the present disclosure using the data (113), to generate the HR shadow-free image (114). In an embodiment, each of the modules (112) may be a hardware unit which may be outside the memory (111) and coupled with the apparatus (108). As used herein, the term modules refer to an Application Specific Integrated Circuit (ASIC), an electronic circuit, a Field-Programmable Gate Arrays (FPGA), Programmable System-on-Chip (Pesos), a combinational logic circuit, and/or other suitable components that provide described functionality. In addition, the memory (111) may, in some examples, be considered a non-transitory storage medium. The term "non-transitory" may indicate that the storage medium is not embodied in a carrier wave or a propagated signal. However, the term "non-transitory" should not be interpreted that the memory (111) is non-movable. In some examples, the memory (111) can be configured to store larger amounts of information than the memory. In certain examples, a non-transitory storage medium may store data that can, over time, change (e.g., in Random Access Memory (RAM) or cache). The memory (111) can be an internal storage or it can be an external storage unit of the electronic device (100), a cloud storage, or any other type of external storage.

The modules (112) when configured with the described functionality defined in the present disclosure will result in a novel hardware. The apparatus (108) further comprises an Input/Output (I/O) interface (110). The I/O interface (e.g., including various I/O circuitry) (110) is coupled with the processor (109) through which an input signal or/and an output signal is communicated. The input signal and the output signal may represent data received by the apparatus (108) and data transmitted by the apparatus (108), respectively. In an embodiment of the present disclosure, the apparatus (108) may be configured to receive and transmit data via the I/O interface (110). The received data may comprise the HR image (105) including the one or more shadows (106), and the like. The transmitted data may include the HR shadow-free image (114) by removing the one or more shadows (106) in the HR image (105) using a second Artificial Intelligence (AI) model, and the like.

In an embodiment, the apparatus (108) may communicate with the at least one user device (103) associated with the at least one user (102) via the communication network (107). In an embodiment, the apparatus (108) may be integral part of at least one user device (103). The at least one user device (103) may communicate with the apparatus (108) over the communication network (107) via one or more Application Program Interfaces (APIs). The communication network (107) may include, for example, and without limitation, a direct interconnection, Local Area Network (LAN), Wide Area Network (WAN), wireless network (e.g., using Wireless Application Protocol), the Internet, Ultra-Wide Band, etc.

In an embodiment, the apparatus (108) may be configured to receive the HR image (105) including the one or more shadows (106) by the at least one user device (103). The apparatus (108) may be configured to convert the HR image (105) into a Low Resolution (LR) image (not shown in FIG. 1). The apparatus (108) may be configured to generate a LR shadow-free image (not shown in FIG. 1) from the LR image using a first AI model (not shown in FIG. 1). The apparatus (108) may be configured to generate the HR shadow-free image (114) based on combination of the LR shadow-free image (not shown in FIG. 1) and the HR image (105) using a second AI model (not shown in FIG. 1).

In an example scenario illustrated in FIG. 1, consider the at least one user (102) such as customer may visit the restaurant or any other equivalent (101) to avail the plurality of (Food & Beverages) F&B services. The at least one user (102) may order the at least one food item (104). The at least one food item (104) may include vegetable salad, soup, snacks, dessert food, and the like. Upon receiving the at least one food item (104) the at least one user (102) may capture the HR image (105) (e.g., 12 Megapixel (MP)) of the at least one food item or a document or any general scene (104) by accessing the camera application installed in the at least one user device (103) for activating one or more sensors (not shown in FIG. 1). The one or more sensors may include, for example, one or more cameras. The one or more cameras may include, for example, and without limitation, an ultra-wide camera, a telephoto camera, a periscope zoom camera, a macro camera, a monochrome camera, a three-dimensional Time of Flight (ToF) camera, and the like. For example, the at least one user (102) may capture the HR image (105) of the at least one food item (104) to share within friends' community or the at least one user (102) may store the HR image (105) in the at least one user device (103) for future use such as food blog writing or to perform some creative activities on the stored HR image (105) for commercial use, and so on. The at least one user (102) may encounter with image artifacts such as one or more shadows (106) in the HR image (105). The one or more shadows (106) may be created in the HR image (105) based on the restaurant (101) indoor environment conditions such as light condition, and the like. The one or more shadows (106) may decrease visual quality of the HR image (105). The at least one user (102) may desire to remove the one or more shadows (106) from the HR image (105) to increase the visual quality of the HR image (105). The one or more shadows (106) in the HR image (105) may be removed by the apparatus (108) to generate the HR shadow-free image (114) upon receiving the HR image (105) by the at least one user device (103) via the communication network (107).

Figure 2:
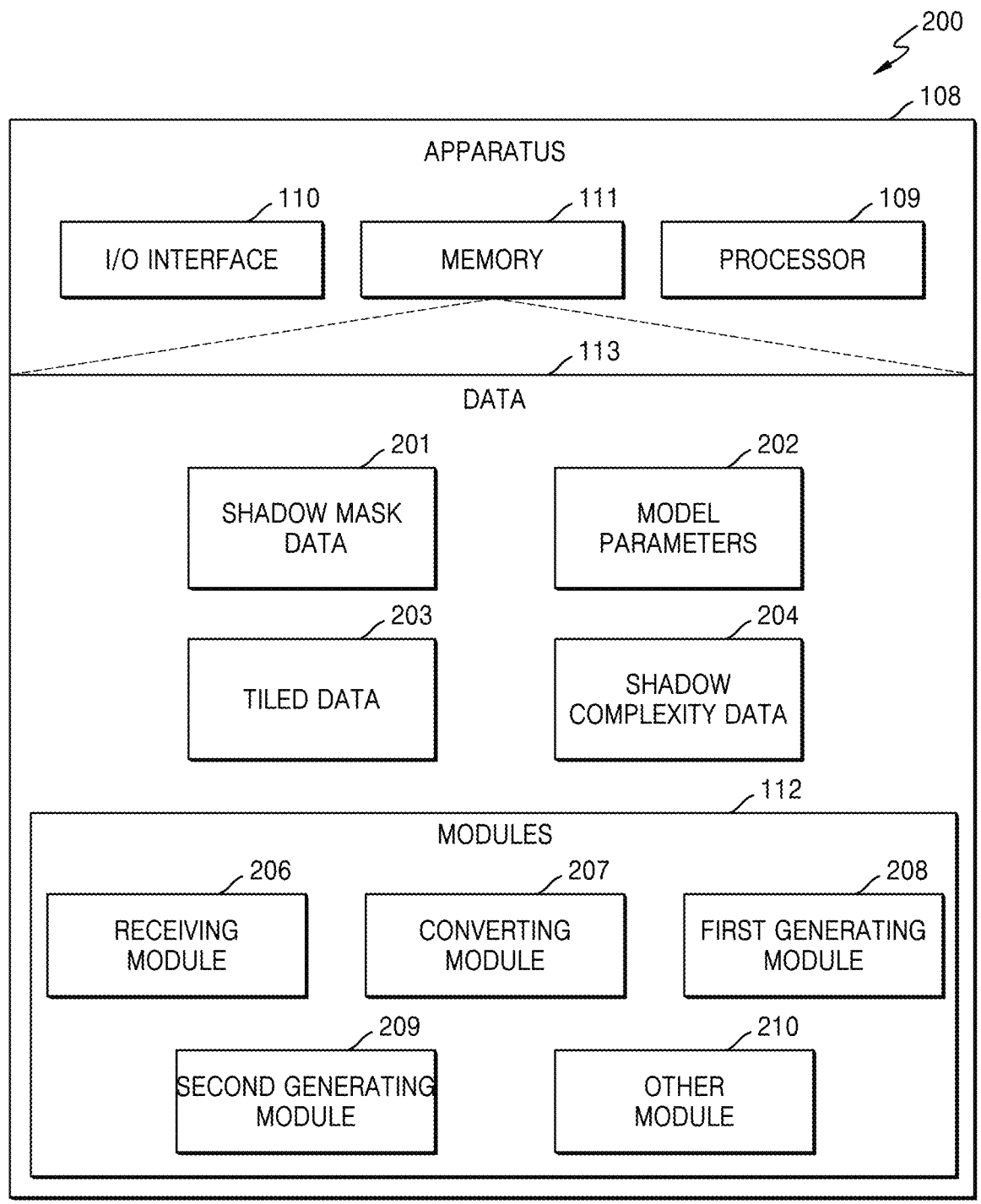
FIG. 2 is a block diagram illustrating an example configuration of an apparatus for generating a High Resolution (HR) shadow-free image, according to various embodiments.

FIG. 2 is a block diagram illustrating an example configuration of the apparatus (108) for generating the High Resolution (HR) shadow-free image (114), according to various embodiments. In various implementations, the apparatus (108) may include the memory (111) storing instructions, executable by the processor (e.g., including processing circuitry) (109), which, on execution, may cause the apparatus (108) to generate the HR shadow-free image with degrading quality of the HR image (105). In an embodiment, the memory (111) may include data (113) and one or more modules (e.g., including various processing circuitry and/or executable program instructions) (112). In an embodiment, each of the one or more modules (112) may be a hardware unit which may be outside the memory (111) and coupled with the apparatus (108). In an embodiment, the data (113) may include for example, shadow mask data (201), model parameters (202), tiled data (203), and shadow complexity data (204).

In an embodiment, shadow mask data (201), may include one of binary shadow mask details or non-binary shadow mask details. The binary shadow mask (not shown in FIGS. 1 and 2) of the HR image (105) may include both non-shadow region and shadow region. The shadow region depicts the one or more shadows (106) which is represented by white pixels and the non-shadow region of the HR image (105) is represented with black pixels as an example representation. Each black pixel value is 0 and each white pixel value is 255. The non-binary shadow mask (not shown in FIGS. 1 and 2) may include both non-shadow region and shadow region. The shadow region depicts the one or more shadows (106) which is represented by colour pixels and the non-shadow region of the HR image (105) is represented with black pixels as an example representation. Each black pixel value is 0 and each color pixel value ranges from 0 to 255.

In an embodiment, the model parameters (202) may include one or more parameters. The one or more parameters may be related to the first AI model, the second AI model and the third AI model. The one or more parameters may include, but are not limited to, a model weight, model hyper parameters, model layers, a model bias, labels, and feature maps. The first AI model, and the second AI model may use these one or more parameters to provide HR-shadow free image. The third AI model may use the one or more parameters to provide the non-binary shadow mask.

Figure 3B:
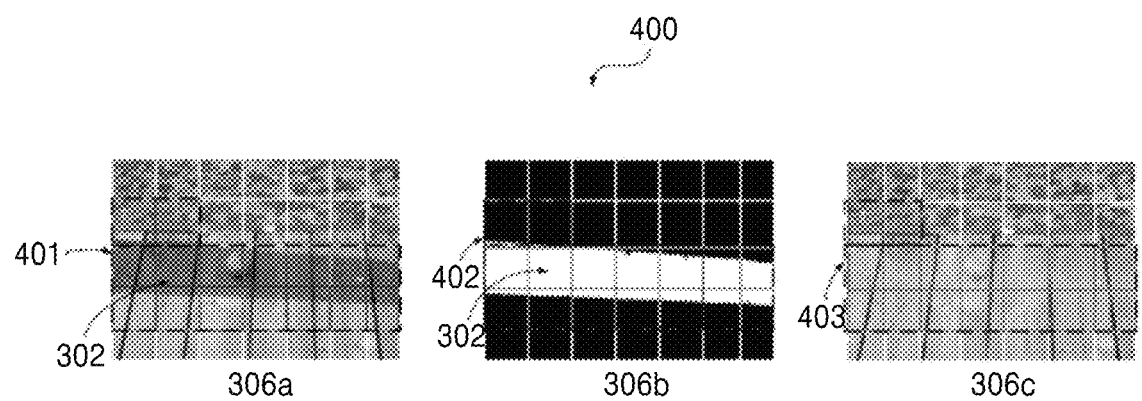
FIG. 3B is a diagram illustrating an example of selective processing of a HR tiled image, according to various embodiments.

In an embodiment, tiled data (203), may include tiled HR image (306a) (refer to FIG. 3B), tiled LR shadow-free image (306c) (refer to FIG. 3B) and tiled shadow mask (306b) (refer to FIG. 3B). The tiled data (203) may be provided to the second AI model to generate the HR shadow-free image (114) based on processing only selected subset of tiles of the tiled HR image. For example, tiled image may be created by segmenting an image into a plurality of rectangular areas. Each rectangular area depicts a tile.

In an embodiment, the shadow complexity data (204), may include data related to the one or more shadows (302) (refer to FIG. 3A) of the non-binary shadow mask (303b) (refer to FIG. 3A). The shadow complexity data (204) may include one or more shadow characteristics related to the one or more shadows (302) present in the non-binary shadow mask (303b). The one or more shadow characteristics may include a shadow color, a shadow shape, a shadow intensity, background of shadow, and overlapping of the one or more shadows (302) in the non-binary shadow mask (303b). In an embodiment, shadow complexity data (204) may include data related to the one or more shadows (302) of the binary shadow mask (303a) (refer to FIG. 3A). The shadow complexity data (204) may include one or more shadow characteristics related to the one or more shadows (302) present in the binary shadow mask (303a). The one or more shadow characteristics may include a shadow shape, a shadow intensity, background of shadow, and overlapping of the one or more shadows (302) in the binary shadow mask (303a).

In an embodiment, trained dataset (not shown), may include trained, and validated data set related to the HR image (105) including the one or more shadows (106). In an embodiment, the apparatus (108) may be implemented as an application in the at least one user device (103), in such case, the trained dataset may be stored in a database of a server associated with the application.

In an implementation, the modules (112) may include, for example, a receiving module (206), a converting module (207), a first generating module (208), a second generating module (209) and other modules (210). It may be appreciated that such modules (112) may be represented as a single module or a combination of different modules, and that each of the modules may include various processing circuitry and/or executable program instructions.

FIG. 3A is a diagram illustrating an example apparatus (108) for generating the HR shadow-free image, according to various embodiments.

In an embodiment, the receiving module (206), is configured to receive a HR image (301) comprising one or more shadows (302) by the at least one user device (103) via the communication network (107). For example, the received HR image (301) may be 12MP image. The receiving module (206) may be a transceiver in case the apparatus (108) is not implemented in the at least one user device (103). The receiving module (206) may be an Application Program Interface (API) in case the apparatus (108) is implemented in the at least one user device (103). The API may receive the HR image (301) from the camera application of the at least one user device (103). The value of resolution is only an example and should not be considered as a limitation.

In an embodiment, shadow mask (303) may include one of a binary shadow mask (303a) or a non-binary shadow mask (303b). The binary shadow mask (303a) may be generated by the receiving module (206) using one of one or more image processing techniques as known in the art or using the third AI model or using a user input by identifying the one or more shadows (302) and the location of the one or more shadows (302) in the HR image (301). In an embodiment, the non-binary shadow mask (303b) is generated by the receiving module (206) using the third AI model. The binary shadow mask (303a) or non-binary shadow mask (303b) may be inputted to the converting module (207).

In an embodiment, the shadow mask (303) may include one of the binary shadow mask (303a) or the non-binary shadow mask (303b). The binary shadow mask (303a) may be generated by the apparatus (108) using the one of one or more image processing techniques or using the third AI model or the user input by identifying the one or more shadows (302) and the location of the one or more shadows (302) in the HR image (301). In an embodiment, the non-binary shadow mask (303b) is generated by the apparatus (108) using the third AI model.

In an embodiment, the converting module (207), is configured to down sample the HR image (301) into the LR image. For example, the received HR image (301) having image resolution size of 1024×1024 is down sampled into the LR image. The converted LR image may be of image resolution size 512×512. The converting module (207) may be configured to down sample the HR image (301) to LR image using one or more image down sampling techniques.

In an embodiment, the first generating module (208), is configured to generate a LR shadow-free image (305) from the LR image. The LR image may be received from the converting module (207). The first generating module (208) is configured to remove the one or more shadows (302) from the LR image by applying the first AI model (304a, or 304b, or . . . 304n) using the shadow mask (303) as a reference to generate the LR shadow-free image. The LR shadow-free image (305) is up sampled by the first generating module (208) and provided to the second generating module (209).

In an embodiment, the first AI model (304a, or 304b, or . . . 304n), may be created by gathering a plurality of datasets related to the HR image (301) including one or more shadows (302). The plurality of datasets may include, but not limited to, the historic information related to plurality of HR images including one or more shadows, corresponding shadow masks, and corresponding LR shadow-free images. As an example, Image Shadow Triplets Dataset (ISTD) may be utilized for training and evaluating the performance of the first AI model (304a, or 304b, or . . . 304n). The gathered plurality of data sets is screened and resized based on requirements. For instance, removing incorrectly added data such as HR image (301) without shadows and incorrectly identified elements in the HR image (301) as shadow. In an embodiment, such incorrect and inefficient data may be discarded. In an embodiment, the first AI model (304a, or 304b, or . . . 304n) may, for example, and without limitation, include at least one of Deep Convolution Neural Network (DCNN) or Machine Learning (ML) Model. The Deep Convolution Neural Network (DCNN) or ML model is trained to provide the LR shadow-free image (305). The first AI model (304a, or 304b, or . . . 304n) selects data from the plurality of datasets randomly for validating trained data. With training and validation, accuracy, and loss of ground truth values of the LR shadow-free image (305) are calculated. Once the first AI model (304a, or 304b, or . . . 304n) is optimized with the given plurality of datasets, the first AI model (304a, or 304b, or . . . 304n) may be used to generate the LR shadow-free image (305) in real-time. In an embodiment, the first AI model (304a, or 304b, or . . . 304n) may be any artificial neural network.

In an embodiment, the DCNN or ML model is trained to provide the LR shadow-free image (305). The DCNN or ML model may include an encoder block, a plurality bottleneck residual blocks, an Atrous Spatial Pyramid Pooling (ASPP) block and a decoder block. The encoder block may be configured to take inputs (e.g., images such as the HR image (301) and the shadow mask (303) and outputs a feature map/vector/tensor. The feature vector holds the information or the features, which represents the input. Each residual block includes convolution layers. Each convolutional layer comprises of filter banks which are convolved with the input feature vectors. The ASPP block may be applied to capture rich global context from inputs at multiple scales. The ASPP module may be applied to a last feature map associated with a last residual block of the plurality of residual blocks for capturing rich global context at multiple scales. The decoder block may be configured to take the feature vector from the encoder and gives the best closest match to the actual input or intended output. In an embodiment, the first AI model (304a, or 304b, or . . . 304n) may include any neural network architecture to provide the LR shadow-free image (305).

In an embodiment, each first AI model (304a, or 304b, or . . . 304n) of plurality of first AI models (304a, or 304b, or . . . 304n) may be trained with different configurations such as smaller number of network parameters, medium number of network parameters and large number of network parameters. Each of the first AI model (304a, or 304b, or . . . 304n) of the plurality of first AI models (304a, or 304b, or . . . 304n) may be created using the smaller number of network parameters, the medium number of network parameters and the large number network parameters with varying complexity of the network. The DCNN or ML model is used to provide the LR shadow-free image (305). Based on computational requirements, the first generating module (208) may be configured to apply the first AI model (304a, or 304b, or . . . 304n) from the plurality of first AI models (304a, or 304b, or . . . 304n). In an embodiment, for example, i) when the first AI model (304a, or 304b, or . . . 304n) trained with less number convolution layers, less feature vectors, less global context, are generated, ii) when the first AI model (304a, or 304b, or . . . 304n) is trained with medium number convolution layers, medium feature vectors, medium global context, are generated, iii) when the first AI model (304a, or 304b, or . . . 304n) is trained with large number convolution layers, large feature vectors, rich global context, are generated. For example, the first AI model 1 (304a) may be trained with smaller number of network parameters and first AI model 2 (304b) may be trained with medium number of network parameters. Based on the one or more shadows (302) complexity, the first AI model (304a, or, 304b, or . . . 304n) is selected from the plurality of the first AI models (304a, or 304b, or . . . 304n). For instance, the one or more shadows (302) in the HR image (301) determined to be less complex, then the first AI model (304a, or 304b, or . . . 304n) trained with the large number of network parameters is not required. So, the first generating module (208) selects the first AI model 1 (304a) trained with less parameters from the plurality of first AI models (304a, or 304b, or . . . 304n) to save the computational resources. In an embodiment, the first generating module (208) may be configured to apply a single first generating model.

In an embodiment, the second generating module (209), is configured to generate a HR shadow-free image (308) based on the LR shadow-free image (305), the shadow mask (303) and the HR image (301) using the second AI model (307a, or 307b, or . . . 307n). The one or more shadows (302) in the HR image (301) may be identified using the shadow mask (303). The second generating module (209) is configured to generate the HR shadow-free image (308) by applying the second AI model (307a, or 307b, or . . . 307n). The HR shadow-free image (308) comprises high frequency information obtained from the HR image (301), and low frequency information obtained from the LR shadow-free image (305) in region of the one or more shadows (302). Before providing inputs such as the LR shadow-free image (305), the shadow mask (303) and the HR image (301) to the second generating module (209), a plurality of tiles may be generated for the HR image (301), the shadow mask (303), and the LR shadow-free image (305) to output tiled HR image (306a), tiled shadow mask (306b), and tiled LR shadow-free image (306c). The tiled HR image (306a), the tiled shadow mask (306b), and the tiled LR shadow-free image (306c) may be provided to the second generating module (209). The low frequency information may comprises at least one of color and texture in the image. And, the high frequency information may further comprise the finer details such as edges in the image. HR image may comprise high frequency information. LR image may comprises low frequency information.

Now referring to FIG. 3B, the tiled images are represented. The second generating module (209) is used to select a subset of tiles (401) in the tiled HR image (306a) from a set of tiles (402) comprising one or more shadows (302) obtained from the corresponding tiled shadow mask (306b). The tiled shadow mask (306b) is used as a reference to select the subset of tiles (401) from the tiled HR image (306a). The second generating module (209) is configured to process the selected subset of tiles (401) of the tiled HR image (306a) by retrieving low frequency information from the corresponding subset of tiles (403) of the tiled LR shadow-free image (306c). The second generating module (209) is configured to generate the HR shadow-free image (308) by combining the processed selected subset of tiles (401) of the tiled HR image (306a) with remaining tiles (e.g., tiles which are present outside the selected subset of tiles (401)) of the tiled HR image (306a). Thus, only selected subset of the tiles (401) of the tiled HR image (306a) may be processed and unselected tiles or tiles which are present outside selected region are remained to be equal to original ground truth value of the HR image (301). The HR shadow-free image (308) includes high frequency information obtained from the HR image (301), and low frequency information obtained from the LR shadow-free image (305) in region of the one or more shadows (302).

In an embodiment, the second AI model (307a, or 307b, or . . . 307n), may be created by gathering a plurality of datasets related to the HR image (301) including the one or more shadows (302). The plurality of datasets may include, but not limited to, historic information related to plurality of HR images including the one or more shadows (302), corresponding shadow masks, corresponding high frequency information from the HR image (301) and low frequency information from the LR shadow-free image (305). As an example, Image Shadow Triplets Dataset (ISTD) may be utilized for training and evaluating the performance of the second AI model (307a, or 307b, or . . . 307n). The gathered plurality of data sets is screened and tiled based on requirements. For instance, removing incorrectly added data such as HR image (301) without shadows and incorrectly tiling the one or more shadows (302) in the HR image (301). In an embodiment, such incorrect and inefficient data may be discarded. In an embodiment, the second AI model (307a, or 307b, or . . . 307n) may be one of DCNN or ML model. The DCNN or ML model trained to provide the HR shadow-free image (308). The second AI model (307a, or 307b, or . . . 307n) selects data from the plurality of data sets randomly for validating trained data. With training and validation, accuracy and loss of ground truth values of the HR shadow-free image (308) are calculated. Once the second AI model (307a, or 307b, or . . . 307n) is optimized with the given set of data set, the second AI model (307a, or 307b, or . . . 307n) may be used to generate the HR shadow-free image (309). In an embodiment, the second AI model (307a, or 307b, or . . . 307n) may be any artificial neural network.

In an embodiment, the DCNN or ML model is trained to provide the HR shadow-free image (308). The DCNN or ML model may include an encoder block, a plurality bottleneck residual blocks, and a decoder block or it can include any of the existing architectures or variations of the DCNN.

In an embodiment, each second AI model (307a, or 307b, or . . . 307n) of plurality of second AI models (307a, or 307b, or . . . 307n) may be trained with different configurations such as smaller number of network parameters, medium number of network parameters and large number of network parameters. Each of the second AI model (307a, or 307b, or . . . 307n) of the plurality of second AI models (307a, or 307b, or . . . 307n) may be created using the smaller number of network parameters, the medium number of network parameters and the large number network parameters. The DCNN or ML model is used to provide the HR shadow-free image (308). Based on computational requirements, the second generating module (209) may be configured to apply the second AI model (307a, or 307b, or . . . 307n) from the plurality of second AI models (307a, or, 307b, or . . . 307n). Based on upscaling factor, the second AI model (307a, or 307b, or . . . 307n) is selected from the plurality of the second AI models (307a, or 307b, or . . . 307n). For example, upscaling factor may indicate image resolution of at least one of HR image (301) and LR shadow-free image (305). In an embodiment, the second generating module (209) may be configured to apply single second AI model.

FIG. 4 is a flowchart illustrating an example method for removing the one or more shadows (106) from the HR image (105), according to various embodiments. The operations may be performed using the apparatus (108). The order in which the method (500) may be described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

At operation 501, the receiving module (206) receives the HR image (301) including the one or more shadows (302). The HR image (301) captured by the at least one user device (103) using the one or more sensors associated with the at least one user device (103). For example, the received HR image (301) may be 12MP image. In an embodiment, the receiving module (206) may generate the one of binary shadow mask (303*a*) or non-binary shadow mask (303*b*). The receiving module (206) may generate the binary shadow mask (303*a*) using one of the image processing techniques known in the art or the user input. For example, the user input may indicate Region of Interest (ROI) in the HR image (301). The ROI may depict one or more shadows (302) present in the HR image (301). Based on receiving the user input, the receiving module (206) may generate the binary shadow mask (303*a*). In the binary shadow mask (303*a*), the ROI may be represented with white pixels and non-ROI may represented with black pixels. The receiving module (206) may generate the non-binary shadow mask (303*b*) using the third AI model. The third AI model may be one of DCNN or ML model. The DCNN or ML model trained to provide the non-binary shadow mask (303*b*). The location of the one or more shadows (302) in the HR image (301) may be determined. The shadow mask (303) may be generated based on the identification of the one or more shadows (302) and the location of the one or more shadows (302) in the HR image (301).

In an embodiment, the third AI model, may be created by gathering a plurality of datasets related to HR image (301) including one or more shadows (302). The plurality of datasets may include, but not limited to, historic information related to the plurality of HR images including one or more shadows (302) and the plurality of non-binary shadow masks. The gathered plurality of datasets is screened based on the requirement. For instance, removing incorrectly added data such as HR image (301) without shadows and incorrectly identified HR image (301) elements as the one or more shadows (302) in the HR image (301). In an embodiment, such incorrect and inefficient data may be discarded. In an embodiment, the third AI model may be at least one of DCNN or ML model. The DCNN or ML model trained to provide the non-binary shadow mask (303*b*). The third AI model selects data from the plurality of datasets randomly for validating trained data. With training and validation, accuracy of the one or more shadows (302) of the HR image (301) are identified. Once the third AI model is optimized with the given plurality of datasets, the third AI model may be used to generate the non-binary shadow mask (303*b*). In an embodiment, the third AI model may be any artificial neural network.

In an embodiment, the DCNN or ML model is trained to provide the non-binary shadow mask (303*b*). The DCNN or ML model may include an encoder block, plurality bottleneck residual blocks, ASPP block, and a decoder block or it can include any of the existing architectures or variations of the DCNN.

At operation 502, the converting module (207), converts the HR image (301) into the LR image. For example, the received HR image (301) image resolution is down sampled to covert the HR image (301) into the LR image. One or more image down sampling techniques, may be implemented to convert the HR image (301) to the LR image.

At operation 503, the first generating module (208), generates the LR shadow-free image (305) by applying the first AI model (304*a*, or 304*b*, or . . . 304*n*) to remove the one or more shadows (302) from the LR image using the shadow mask (303) as a reference to generate LR shadow-free image (305). In an embodiment, the first AI model (304*a*, or 304*b*, or . . . 304*n*) may be selected from the plurality of first AI models (304*a*, or 304*b*, or . . . 304*n*) by the first generating module (208) based on the complexity the one or more shadows (302). The first generating module (208) may access data related to the complexity of the one or more shadows (302) from the shadow complexity data (204) in selection of the first AI model (304*a*, or 304*b*, or . . . 304*n*) from the plurality of first AI models (304*a*, or 304*b*, or . . . 304*n*).

At operation 504, by the second generating module (209) generates the HR shadow-free image (308) based on the LR shadow-free image (305) and the HR image (301) by applying the second AI model (307*a*, or 307*b*, or . . . 307*n*). The one or more shadows (302) may be identified in the HR image (301) using the shadow mask (303). The HR shadow-free image (308) comprises high frequency information obtained from the HR image (301), and low frequency information obtained from the LR shadow-free image in region of the one or more shadows (302). The second AI model (307*a*, or 307*b*, or . . . 307*n*) may be selected from the plurality of second AI models (307*a*, or 307*b*, or . . . 307*n*) by the second generating module (209) based on the upscaling factor.

FIG. 5 is a flowchart illustrating an example method for selectively processing the High Resolution (HR) image (301) for removing the one or more shadows (302), according to various embodiments. The operations may be performed using the apparatus (108). The order in which the method (600) may be described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

At operation 601, the processor (109) of the apparatus (108), receives a High Resolution (HR) image (301) comprising one or more shadows (302), shadow mask (303), and a Low Resolution (LR) shadow-free image (305). Referring back to FIG. 1 and FIG. 3A, the HR image (301) may be provided by the at least one user (102) via the at least one user device (103). The shadow mask (303) may be generated based on the identification of the one or more shadows (302) and the location of the one or more shadows (302) in the HR image (301) using one of the third AI model or the image processing techniques or the user input. The LR shadow-free image (305) is an output of the first generating module (208) generated by applying the first AI model (304*a*, or 304*b*, or . . . 304*n*).

At operation 602, the processor (109), generates a plurality of tiles for the HR image (301), the shadow mask (303) and the LR shadow-free image (305) to output tiled HR image (306*a*), tiled shadow mask (306*b*) and tiled LR shadow-free image (306*c*). Referring back to FIG. 3A, the processor (109) may be configured to output tiled HR image (306*a*) by segmenting the HR image (301) into plurality of rectangular areas. Each rectangular area depicts a tile. Similarly, the tiled shadow mask (306*b*) and the tiled LR shadow-free image (306c) may be outputted by the processor (109) based on segmenting the corresponding shadow mask (303) and LR shadow-free image (305) into plurality of rectangular areas.

At operation 603, the processor (109), selects the subset of tiles (401) in the tiled HR image (306a) based on the subset of tiles (402) comprising one or more shadows (302) obtained from the corresponding tiled shadow mask (306b). Referring back to FIG. 3B, the subset of tiles (401) in the tiled HR image (306a) may be selected by correlating the subset of tiles (402) depicting the one or more shadows (302) from the tiled shadow mask (306b) is used as a reference to select the subset of tiles (401) from the tiled HR image (306a).

At operation 604, the processor (109), process the selected subset of tiles (401) of the tiled HR image (306a), using one of an Artificial Intelligence (AI) technique or image processing techniques for removing one or more shadows (302) in the tiled HR image (306a). For instance, the one or more shadows (302) may cover six tiles in the tiled HR image (306a). Then six tiles are considered as subset of tiles. In the same or similar way, the tiled shadow mask (306b) may be used as reference to select the subset of tiles (403) in the tiled LR shadow-free image (306c). The AI technique or image processing techniques known in the art may be used to compare the selected subset of tiles (401) of the tiled HR image (306a) with the subset of tiles (403) of the tiled LR shadow-free image (306c). The selected subset of tiles (401) of the tiled HR image (306a) may be processed by the processor (109) by retrieving low frequency information from the corresponding subset of tiles (403) of the tiled LR shadow-free image (306c). In an embodiment, the AI technique may implement the second AI model (307a, or 307b, or . . . 307n).

At operation 605, the processor (109), generates the HR shadow-free image (308) by combining the processed selected subset of tiles (401) of the tiled HR image (306a) with the remaining tiles of the tiled HR image (306a). The remaining tiles indicates unselected tiles present in the tiled HR image (306a) apart from the selected subset of tiles (401). The remaining tiles indicates high frequency information obtained from the HR image (301), and processed tiles e.g., the selected subset of tiles (401) indicates low frequency information obtained from the LR shadow-free image (305).

FIG. 6 is flowchart illustrating an example method for removing the one or more shadows (302) in the High Resolution (HR) image (301) based on complexity of one or more shadows (302), according to various embodiments. The operations may be performed using the apparatus (108). The order in which the method (700) may be described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

At operation 701, the processor (109) of the apparatus (108), receives a High Resolution (HR) image (301) comprising one or more shadows (302). Referring back to FIG. 1 and FIG. 3A, the HR image (301) may be provided by the at least one user (102) by capturing the HR image (301) by accessing the camera application installed in the at least one user device (103).

Figure 7:
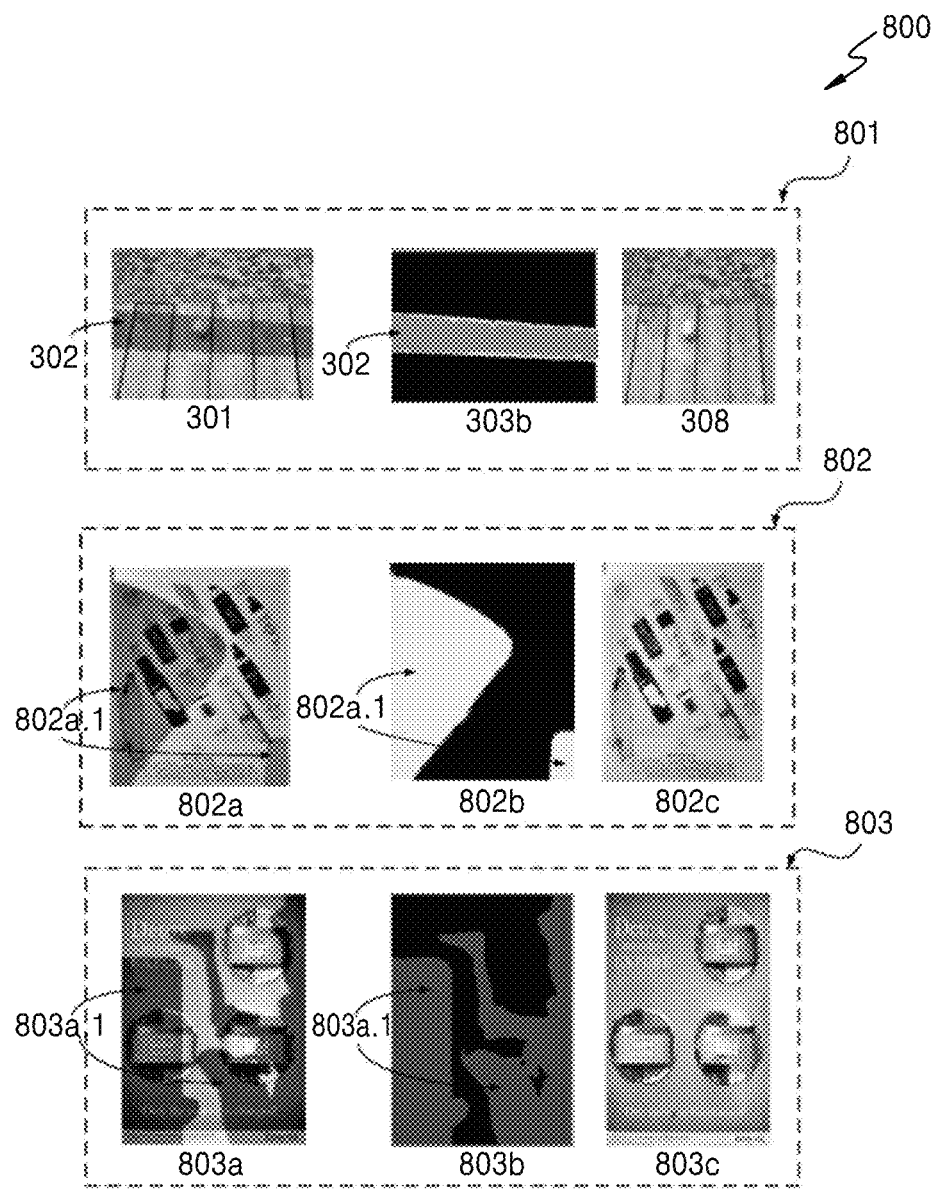
FIG. 7 illustrates various example images illustrating results using the apparatus for removing the one or more shadows from a HR image, according to various embodiments.

At operation 702, the processor (109), determines a complexity of the one or more shadows (302) based on corresponding one or more shadow characteristics, using an Artificial Intelligence (AI) technique with a non-binary shadow mask (303b). The Artificial Intelligence (AI) technique may implement third AI model. The one or more shadow characteristics comprises at least one of a shadow shape, a shadow intensity, a shadow color, background of shadow, and overlapping of shadows. The shadow shape and overlapping of the one or more shadows (302) may indicate how much area is covered by the one or more shadows (302) in the non-binary shadow mask (303b). The shadow intensity indicates that the output pixel value present in the one or more shadows (302) associated with the non-binary shadow mask (303b). Now referring to FIG. 7, FIG. 7 illustrates example results of removing the one or more shadows (302). At 801, the one or more shadows (302) present in the non-binary shadow mask (303b) represent low intensity level. At 802, the one or more shadows (802a.1) present in the non-binary shadow mask (802b) represent medium intensity level. At 803, the one or more shadows (803a.1) present in the non-binary shadow mask (803b) represent high intensity level. For example, intensity level of the one or more shadows (302 or 802a.1 or 803a.1) may be depicted based on at least one of the shadow shape, the shadow intensity, and number of shadows present in the non-binary shadow mask (303b or 802b or 803b). In an embodiment, shadow intensity level may be determined based on the output pixel value present in the one or more shadows (302) associated with the non-binary shadow mask (303b). The output pixel value present in the one or more shadows (302 or 802a.1 or 803a.1) may range from 0 to 255. If the output pixel values near to 0 which may indicate low shadow intensity level and which depicts low complexity, if the output pixel values near to 255 may indicate high shadow intensity level and which depicts high complexity, if the output pixel values near to 128 may indicates medium shadow intensity level and which depicts medium complexity. For example, in the non-binary shadow mask (303b or 802b or 803b), output pixel values in the one or more shadows (302 or 802a.1 or 803a.1) depicts intensity values then these intensity values may be used to determine the complexity of the one or more shadows (302 or 802a.1 or 803a.1). For instance, i) when the output pixel values in the one or more shadows (302) depicts low intensity values then the complexity of the one or more shadows (302) determined to be low, ii) when the output pixel values in the one or more shadows (802a.1) depicts medium intensity values then the complexity of the one or more shadows (802a.1) determined to be medium, ii) when the output pixel values in the one or more shadows (803a.1) depicts high intensity values then the complexity of the one or more shadows (803a.1) determined to be high and so on. The processor (109) may determine the complexity of the one or more shadows (302, 802a.1, 803a.1) associated with each of the HR images (301, 802a, 803a) using corresponding non-binary shadow masks (303b, 802b, 802c) based on respective one or more shadow characteristics associated with each of the non-binary shadow masks (303b, 802b, 802c). In an embodiment, the processor (109) may store the determined complexity data of the one or more shadows (302, 802a.1, 803a.1) in the shadow complexity data (205). In an embodiment, the complexity of the one or more shadows (302, 802a.1, 803a.1) may be determined based on at least one of the shadow shape, the shadow intensity, the number of shadows.

Figure 8:
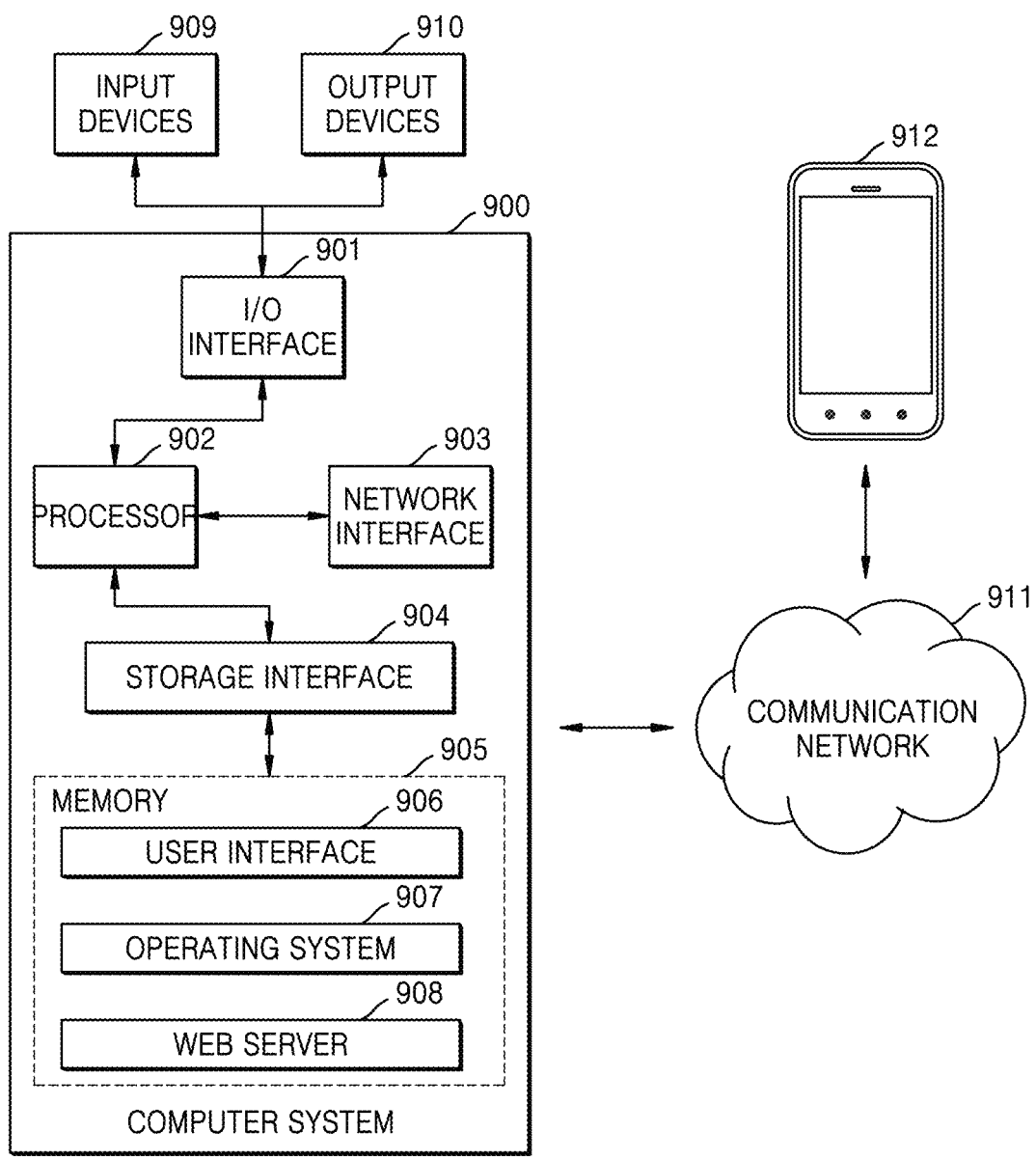
FIG. 8 is a block diagram illustrating an example configuration of a general-purpose computer system implementing an apparatus for removing one or more shadows from a HR image, according to various embodiments.

At operation 703, the processor (109), selects at least one AI model from a plurality of AI models based on the determined complexity for removing the one or more shadows (302 or 802*a*.1 or 803*a*.1) from the HR image (301 or 802*a* or 803*a*). The processor (109) may use the shadow complexity data (204) that is stored, for selecting the at least one AI model from the plurality of the AI models. In an embodiment, the at least one AI model may be implemented as at least one of the first AI model (304*a*, or 3*o*4*b*, or . . . 304*n*) and the second AI model (307*a*, or 307*b*, or . . . 307*n*). During selection of AI model, i) when the complexity of the one or more shadows (302 or 802*a*.1 or 803*a*.1) determined to be high, then the processor (109) selects the AI model trained with large network parameters from the plurality of AI models, and ii) when the complexity of the one or more shadows (302 or 802*a*.1 or 803*a*.1) determined to be low, then the processor (109) selects the AI model trained with less network parameters from the plurality of AI models. For instance, at 801, the complexity of the one or more shadow (302) determined to be low, then the processor (109) selects the AI model trained with less network parameters from the plurality of AI models. At 802, the complexity of the one or more shadow (802*a*.1) determined to be medium, then the processor (109) selects the AI model trained with medium network parameters from the plurality of AI models. At 803, the complexity of the one or more shadow (803*a*.1) determined to be high, then the processor (109) selects the AI model trained with large network parameters from the plurality of AI models. FIG. 8 is a block diagram illustrating an example general-purpose computer system implementing the apparatus (108) for removing the one or more shadows in the HR image according to various embodiments. In an embodiment, the computer system (900) may be used to implement the method of removing the one or more shadows in the HR image. The computer system (900) may include a central processing unit ("CPU" or "processor") (902). The processor (902) may comprise at least one data processor for executing program components for dynamic resource allocation at run time. The processor (902) may include specialized processing units such as integrated system (bus) controllers, memory management control units, floating point units, graphics processing units, digital signal processing units, etc.

The processor (902) may be disposed in communication with one or more input/output (I/O) devices (not shown) via I/O interface (901). The I/O interface (901) may include various I/O circuitry and employ communication protocols/methods such as, for example, without limitation, audio, analog, digital, monoaural, RCA, stereo, IEEE-(1394), serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (901), the computer system (900) may communicate with one or more I/O devices. For example, the input device (909) may include, for example, and without limitation, an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (910) may include, for example, and without limitation, a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In various embodiments, the computer system (900) is connected to the user device (912) through a communication network (911). The processor (902) may be disposed in communication with the communication network (911) via a network interface (903). The network interface (903) may include various communication circuitry and communicate with the communication network (911). The network interface (903) may employ connection protocols including, for example, and without limitation, direct connect, Ethernet (e.g., twisted pair 10/100/1000 Base T), transmission control protocol/Internet protocol (TCP/IP), token ring, IEEE 802.11a/b/g/n/x, etc. The communication network (911) may include, for example, and without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (903) and the communication network (911), the computer system (900) may communicate with the one or more service operators.

In various embodiments, the processor (902) may be disposed in communication with a memory (905) (e.g., RAM, ROM, etc.) via a storage interface (904). The storage interface (904) may include various circuitry and connect to memory (905) including, for example, and without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory (905) drives may further include, for example, and without limitation, a drum, magnetic disc drive, magneto-optical drive, optical drive, Redundant Array of Independent Discs (RAID), solid-state memory devices, solid-state drives, etc.

The memory (905) may store a collection of program or database components, including, without limitation, a user interface (906), an operating system (907), web browser/server (908) etc. In various embodiments, computer system (900) may store user/application data, such as the data, variables, records, etc. as described in this disclosure. Such databases may be implemented as fault-tolerant, relational, scalable, secure databases such as Oracle or Sybase.

The operating system (907) may facilitate resource management and operation of the computer system (900). Examples of operating systems include, for example, and without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

In various embodiments, the computer system (900) may implement a web server (908) stored program component. The web server (908) may include a hypertext viewing application, such as, for example, and without limitation, MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers (908) may utilize facilities such as AJAX, DHTML, ADOBE® FLASH®, JAVASCRIPT®, JAVA®, Application Programming Interfaces (APIs), etc. In various embodiments, the computer system (900) may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some embodiments, the computer system (900) may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the disclosure. A non-transitory computer-readable storage medium refers to any type of physical memory (905) on which information or data readable by a processor (902) may be stored. A non-transitory computer-readable storage medium may store instructions for execution by one or more processors, including instructions for causing the processors to perform steps or stages consistent with the embodiments described herein. The term "computer-readable medium" should be understood to include tangible items and exclude carrier waves and transient signals, e.g., non-transitory. Examples include Random Access memory (RAM), Read-Only memory (ROM), volatile memory, non-volatile memory, hard drives, Compact Disc (CD) ROMs, Digital Video Disc (DVDs), flash drives, disks, and any other known physical storage media.

In an embodiment, the computer system (900) may receive the HR image including one or more shadows from a at least one user device (912) via communication network (911).

The terms "an embodiment", "embodiment", "embodiments", "the embodiment", "the embodiments", "one or more embodiments", "some embodiments", and "one embodiment" may refer, for example, to "one or more (but not all) embodiments of the disclosure(s)" unless expressly specified otherwise.

The terms "including", "comprising", "having" and variations thereof may refer, for example, to "including but not limited to", unless expressly specified otherwise.

The enumerated listing of items does not imply that any or all of the items are mutually exclusive, unless expressly specified otherwise. The terms "a", "an" and "the" refer, for example, to "one or more", unless expressly specified otherwise.

A description of an embodiment with several components in communication with each other does not imply that all such components are required. For example, a variety of optional components are described to illustrate the wide variety of possible embodiments of the disclosure.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, various embodiments of the disclosure need not include the device itself.

The illustrated operations of FIGS. 4, 5 and 6 show certain events occurring in a certain order. In various embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The language used in the disclosure has been principally selected for readability and instructional purposes, and it may not have been selected to delineate or circumscribe the disclosed subject matter.

While the disclosure has been illustrated and described with reference to various example embodiments, it will be understood that the various example embodiments are intended to be illustrative, not limiting, and other aspects and embodiments may be apparent to those skilled in the art. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for removing one or more shadows in a High Resolution (HR) image, the method comprising:
   receiving, by an apparatus, an HR image of a scene captured by a camera, the HR image including one or more shadows resulting from lighting conditions in the scene;
   converting, by the apparatus, the HR image into a Low Resolution (LR) image including the one or more shadows;
   generating, by the apparatus, an LR shadow-free image with the one or more shadows removed from the LR image by applying a first Artificial Intelligence (AI) model to the LR image; and
   generating, by the apparatus, an HR shadow-free image by applying a second AI model different from the first AI model to the LR shadow-free image with the one or more shadows removed and the HR image including the one or more shadows,
   wherein generating the HR shadow-free image comprises:
      generating, by the apparatus, a plurality of tiles for each of the HR image including the one or more shadows, a shadow mask, and the LR shadow-free image with the one or more shadows removed to output a tiled HR image comprising a plurality of first tiles, a tiled shadow mask comprising a plurality of second tiles, and a tiled LR shadow-free image comprising a plurality of third tiles;
      selecting, by the apparatus, a subset of the first tiles in the tiled HR image based on a subset of the second tiles comprising one or more shadows obtained from the corresponding tiled shadow mask;
      processing, by the apparatus, the selected subset of the first tiles of the tiled HR image to remove one or more shadows in the tiled HR image by retrieving low frequency information from corresponding third tiles in the tiled LR shadow-free image, using the second AI model; and generating, by the apparatus, the HR shadow-free image by combining the processed subset of first tiles of the tiled HR image with remaining tiles of the tiled HR image comprising high frequency information, wherein the low frequency information comprises at least one of color or texture, and the high frequency information comprises finer details and edge information.

2. The method as claimed in claim 1, wherein generating the LR shadow-free image from the LR image comprises:
generating, by the apparatus, the shadow mask; and
applying, by the apparatus, the first AI model to remove the one or more shadows from the LR image using the shadow mask as a reference to generate the LR shadow-free image.

3. The method as claimed in claim 2, wherein generating the shadow mask comprises:
identifying, by the apparatus, the one or more shadows in the HR image, using one of a third AI model or image processing techniques or a user input;
determining, by the apparatus, a location of the one or more shadows in the HR image; and
generating, by the apparatus, the shadow mask based on the identification of the one or more shadows and the location of the one or more shadows.

4. The method as claimed in claim 1, wherein generating the HR shadow-free image comprises:
identifying, by the apparatus, the one or more shadows using the shadow mask; and
applying, by the apparatus, the second AI model to generate the HR shadow-free image.

5. The method as claimed in claim 1, further comprising:
determining, by the apparatus, a complexity of the one or more shadows based on corresponding one or more shadow characteristics, using an AI technique with a non-binary shadow mask; and
selecting, by the apparatus, the second AI model from a plurality of AI models based on the determined complexity.

6. The method as claimed in claim 5, wherein the one or more shadow characteristics comprises at least one of a shadow shape, a shadow intensity, a shadow color, background of shadow, or overlapping of shadows.

7. An apparatus configured to remove a shadow in a High Resolution (HR) image, the apparatus comprising:
memory,
at least one processor communicatively coupled to the memory and configured to:
receive an HR image of a scene captured by a camera, the HR image including one or more shadows resulting from lighting conditions in the scene;
convert the HR image into a Low Resolution (LR) image including the one or more shadows;
generate an LR shadow-free image with the one or more shadows removed from the LR image by applying a first Artificial Intelligence (AI) model to the LR image; and
generate an HR shadow-free image by applying a second AI model different from the first AI model to the LR shadow-free image with the one or more shadows removed and the HR image including the one or more shadows, wherein at least one processor is configured to:
generate a plurality of tiles for each of the HR image including the one or more shadows, a shadow mask, and the LR shadow-free image with the one or more shadows removed to output a tiled HR image comprising a plurality of first tiles, a tiled shadow mask comprising a plurality of second tiles, and a tiled LR shadow-free image comprising a plurality of third tiles;
select a subset of the first tiles in the tiled HR image based on a subset of the second tiles comprising one or more shadows obtained from the corresponding tiled shadow mask;
process the selected subset of the first tiles of the tiled HR image to remove one or more shadows in the tiled HR image by retrieving low frequency information from corresponding third tiles in the tiled LR shadow-free image, using the second AI model; and
generate the HR shadow-free image by combining the processed subset of first tiles of the tiled HR image with remaining tiles of the tiled HR image comprising high frequency information,
wherein the low frequency information comprises at least one of color or texture, and the high frequency information comprises finer details and edge information.

8. The apparatus as claimed in claim 7, wherein at least one processor is configured to:
generate the shadow mask; and
apply the first AI model to remove the one or more shadows from the LR image using the shadow mask as a reference to generate the LR shadow-free image.

9. The apparatus as claimed in claim 8, wherein at least one processor is configured to:
identify the one or more shadows in the HR image, using one of a third AI model or image processing techniques or an input;
determine a location of the one or more shadows in the HR image; and
generate the shadow mask based on the identification of the one or more shadows and the location of the one or more shadows.

10. The apparatus as claimed in claim 7, wherein at least one processor is configured to:
identify the one or more shadows using the shadow mask; and
apply the second AI model to generate the HR shadow-free image.

11. The apparatus as claimed in claim 7, wherein at least one processor is configured to:
determine a complexity of the one or more shadows based on a corresponding one or more shadow characteristics, using an AI technique with a non-binary shadow mask; and
select the second AI model from a plurality of AI models based on the determined complexity.

12. One or more non-transitory computer-readable storage media, having a computer program stored thereon that, when executed by at least one processor of an apparatus, causes the apparatus to perform operations comprising:
receiving a High Resolution (HR) image of a scene captured by a camera, the HR image including one or more shadows resulting from lighting conditions in the scene;
converting the HR image into a Low Resolution (LR) image including the one or more shadows;

generating an LR shadow-free image with the one or more shadows removed from the LR image by applying a first Artificial Intelligence (AI) model to the LR image; and generating an HR shadow-free image by applying a second AI model different from the first AI model to the LR shadow-free image with the one or more shadows removed and the HR image including the one or more shadows, wherein the operations further comprise:
- generating a plurality of tiles for each of the HR image including the one or more shadows, a shadow mask, and the LR shadow-free image with the one or more shadows removed to output a tiled HR image comprising a plurality of first tiles, a tiled shadow mask comprising a plurality of second tiles, and a tiled LR shadow-free image comprising a plurality of third tiles;
- selecting a subset of the first tiles in the tiled HR image based on a subset of the second tiles comprising one or more shadows obtained from the corresponding tiled shadow mask;
- processing the selected subset of the first tiles of the tiled HR image to remove one or more shadows in the tiled HR image by retrieving low frequency information from corresponding third tiles in the tiled LR shadow-free image, using the second AI model; and
- generating the HR shadow-free image by combining the processed subset of first tiles of the tiled HR image with remaining tiles of the tiled HR image comprising high frequency information, wherein the low frequency information comprises at least one of color or texture, and the high frequency information comprises finer details and edge information.

13. The method as claimed in claim 1, wherein the converting of the HR image into the LR image comprises:
down-sampling, by the apparatus, the HR image to the LR image using one or more image down sampling techniques.

14. The method as claimed in claim 1, wherein the generating of the LR shadow-free image comprises:
generating, by the apparatus, up-sampled LR shadow-free image provided to the second AI model by adjusting resolution size of the LR shadow-free image.

15. The apparatus as claimed in claim 11, wherein the one or more shadow characteristics comprises at least one of a shadow shape, a shadow intensity, a shadow color, background of shadow, or overlapping of shadows.

* * * * *